United States Patent
Bush et al.

(10) Patent No.: US 10,954,115 B2
(45) Date of Patent: Mar. 23, 2021

(54) SYSTEM AND METHOD FOR DELIVERING FUEL

(71) Applicant: MAXUM ENTERPRISES, LLC, Fort Worth, TX (US)

(72) Inventors: Brandon Bush, Edmond, OK (US); David Froehle, Edmond, OK (US)

(73) Assignee: Maxum Enterprises, LLC, Fort Worth, TX (US)

( * ) Notice: Subject to any disclaimer, the term of this patent is extended or adjusted under 35 U.S.C. 154(b) by 0 days.

(21) Appl. No.: 16/222,907

(22) Filed: Dec. 17, 2018

(65) Prior Publication Data
US 2019/0185312 A1 Jun. 20, 2019

Related U.S. Application Data

(60) Provisional application No. 62/607,189, filed on Dec. 18, 2017, provisional application No. 62/625,764, filed on Feb. 2, 2018.

(51) Int. Cl.
| | |
|---|---|
| *B67D 7/04* | (2010.01) |
| *F16K 31/14* | (2006.01) |
| *B67D 7/36* | (2010.01) |
| *E21B 41/00* | (2006.01) |

(52) U.S. Cl.
CPC .............. *B67D 7/04* (2013.01); *B67D 7/362* (2013.01); *F16K 31/14* (2013.01); *E21B 41/00* (2013.01)

(58) Field of Classification Search
CPC ........... B67D 7/04; B67D 7/362; F16K 31/14; E21B 41/00
USPC .................................. 141/198; 137/220, 219
See application file for complete search history.

(56) References Cited

U.S. PATENT DOCUMENTS

| | | | | |
|---|---|---|---|---|
| 2,511,649 A | * | 6/1950 | Reiter | G01F 23/0053 73/297 |
| 2,730,910 A | * | 1/1956 | Province | E21B 19/008 477/83 |
| 2,996,074 A | * | 8/1961 | Page | F16K 1/126 137/220 |
| 3,485,262 A | * | 12/1969 | Perren | B67D 7/362 137/386 |
| 4,167,958 A | * | 9/1979 | Voelz | B67D 7/0488 141/198 |
| 4,203,462 A | * | 5/1980 | Beller | D06F 39/087 134/57 D |

(Continued)

FOREIGN PATENT DOCUMENTS

EP     0566543 A1 * 10/1993 ............. F16K 1/123

*Primary Examiner* — Timothy L Maust
*Assistant Examiner* — James R Hakomaki
(74) *Attorney, Agent, or Firm* — Foley & Lardner LLP

(57) ABSTRACT

A system for delivering fuel to an equipment fuel tank. The system includes a remote fuel storage tank and a valve assembly coupleable to the equipment fuel tank. The system includes a fuel supply line extending between the remote fuel storage tank and the valve assembly and a pneumatic valve disposed in the fuel supply line. The pneumatic valve can prevent flow of fuel into the fuel supply line or can enable flow of fuel into the fuel supply line. The valve assembly includes pressure tubes to detect changes in fuel level inside the equipment fuel tank. A switch actuates the pneumatic valve to prevent the flow of fluid in response to an overfilled position; and actuates the pneumatic valve to enable the flow of fluid in response to an underfilled position.

21 Claims, 12 Drawing Sheets

(56) References Cited

U.S. PATENT DOCUMENTS

| | | | | |
|---|---|---|---|---|
| 4,515,178 | A * | 5/1985 | Campau | F15C 1/007 |
| | | | | 137/393 |
| 4,857,894 | A * | 8/1989 | Dahl | G08B 21/182 |
| | | | | 340/619 |
| 5,253,521 | A * | 10/1993 | Abramovich | G01F 23/0076 |
| | | | | 324/207.21 |
| 5,562,132 | A * | 10/1996 | Siegele | F17C 13/04 |
| | | | | 141/198 |
| 5,755,256 | A * | 5/1998 | Elsdon | B60K 15/04 |
| | | | | 137/390 |
| 5,826,613 | A * | 10/1998 | Schalk | F16K 1/123 |
| | | | | 137/219 |
| 5,942,980 | A * | 8/1999 | Hoben | G01F 23/0076 |
| | | | | 340/614 |
| 6,282,953 | B1 * | 9/2001 | Benjey | B60K 15/077 |
| | | | | 73/438 |
| 6,684,902 | B1 * | 2/2004 | Zinn | E03F 5/101 |
| | | | | 137/14 |
| 6,761,195 | B2 * | 7/2004 | Airaksinen | F16N 19/006 |
| | | | | 141/198 |
| 7,251,998 | B2 * | 8/2007 | Gourlay | G01F 23/14 |
| | | | | 73/290 R |
| 7,938,151 | B2 * | 5/2011 | Hockner | B60P 3/228 |
| | | | | 141/95 |
| 9,346,662 | B2 | 5/2016 | Van Vliet et al. | |
| 9,939,305 | B2 * | 4/2018 | Tetil | G01F 23/14 |
| 10,029,906 | B2 | 7/2018 | Van Vliet et al. | |
| 2004/0093941 | A1 * | 5/2004 | Lopatin | G01F 23/2967 |
| | | | | 73/290 V |
| 2013/0092851 | A1 * | 4/2013 | Sakiya | G01F 23/18 |
| | | | | 250/577 |
| 2017/0305736 | A1 * | 10/2017 | Haile | B67D 7/78 |

* cited by examiner

SYSTEM AND METHOD FOR DELIVERING FUEL

CROSS-REFERENCE TO RELATED APPLICATIONS

This application is related to and claims priority to U.S. Provisional Patent Application No. 62/607,189, entitled "System and Method for Delivering Fuel," filed on Dec. 18, 2017, and is related to and claims priority to U.S. Provisional Patent Application No. 62/625,764, entitled "System and Method for Delivering Fuel," filed on Feb. 2, 2018, which are both herein incorporated by reference in their entirety and for all purposes.

FIELD

This disclosure relates in general to system and method for delivering fuel.

BACKGROUND

Equipment used at well sites can be large in size, operate at high temperatures and pressures, and typically consume large amounts of fuel requiring frequent refueling. The high temperatures and pressures environment creates a dangerous area, or an exclusion zone, at the well site such that personnel is excluded during operation. Operation equipment is physically located at the exclusion zone of the well site. Refueling the equipment oftentimes requires the equipment to be turned off so that personnel can approach the equipment in the exclusion zone. Such interruption due to refueling is not desired since equipment downtime can be costly. Thus, there is a need for a system and method for remotely and automatically refueling equipment during operation of the well site.

SUMMARY

This disclosure presents devices, methods, and systems for automatic delivering fuel using pneumatically controlled valves in a closed mechanical control loop. The pneumatically controlled valves respond to fuel level change and adjust the refueling flow rate, including shutting off the refueling process. The system does not use electronics including any microcontrollers or other electrical components. As such, power requirement is simplified and reliability of the fuel delivery system is improved. The pneumatically controlled valves of the fuel delivery system may have redundant replacement parts ready and allows for quick repair or replacement onsite. Mechanical flow meters, or electrical telemetry, may be used to monitor the operation of the fuel delivery system but they are not necessary nor used for operation. Various features of the fuel delivery system are presented below.

In a general aspect, a system for delivering fuel to a fuel tank of a device at a work site includes a remote fuel bulk storage tank and a valve assembly configured to be coupled to the fuel tank of the device. The fuel tank has a level of fuel changing due to operation of the device. A fuel supply line extends between the remote fuel storage tank and the valve assembly. A pneumatic valve may be disposed in the valve assembly. The pneumatic valve is operable between a closed position, to prevent a flow of fuel from exiting the valve assembly, and an open position, to enable a flow of fuel through the valve assembly. The valve assembly includes one or more pressure tubes to detect changes in the level of fuel in the fuel tank between an under-filled condition and an overfilled condition inside the equipment fuel tank. In response to the fuel in the fuel tank reaching an overfilled position, a pressure switch actuates the pneumatic valve to the closed position. And in response to an under-filled condition, the pressure switch maintains the pneumatic valve in the open position.

In a specific aspect, the one or more pressure tubes includes four inversely situated cups.

In another specific aspect, the one or more pressure tubes are coupled to one or more respective pressure switches.

In yet another specific aspect, the valve assembly includes a manifold disposed between the bulk storage tank and the pressure switch.

In a specific aspect, the fuel delivery system further includes a mechanical pressure indicator, the pressure indicator configured to display an overfilled condition.

In another specific aspect, the fuel delivery system further includes a mechanical pressure indicator configured to display an under-filled condition.

In yet another specific aspect, the valve assembly is at least partially formed in a cap coupling with an opening of the fuel tank of the device.

In a specific aspect, the fuel delivery system further includes a manually operable valve disposed between the bulk supply storage tank and the pneumatic valve.

In another specific aspect, at least one of the one or more pressure tubes detects an overfilled fuel condition and at least another pressure tube detects an under-filled fuel condition.

In a second general aspect, a method for delivering fuel includes coupling a bulk supply tank to an equipment tank via a fuel valve assembly and securing the fuel valve assembly partially within the equipment tank. The fuel valve assembly includes one or more pressure tubes to measure pressures associated with different fuel levels inside the equipment tank. The method further includes providing a pneumatic control valve actuated in response to the conditions detected by the pressure tubes to maintain a fuel level in the device fuel tank between an under-filled condition and an overfilled condition.

In one specific aspect, coupling the bulk supply tank to the equipment tank via the fuel valve assembly includes coupling the bulk supply tank to a manifold of the fuel valve assembly and coupling the manifold of the fuel valve assembly to a cap of the fuel valve assembly, wherein the cap extends into the equipment tank.

In some embodiments, securing the fuel valve assembly partially within the equipment tank includes vertically extending a sensing tube of the cap of the fuel valve assembly into the equipment tank and securing a head of the cap of the fuel valve assembly to an opening of the equipment tank, wherein the head of the cap carries a fueling line for delivering fuel into the equipment tank.

In some other embodiments, vertically extending the sensing tube of the cap of the fuel valve assembly into the equipment tank includes submerging a portion of the sensing tube into a level of fuel of the equipment tank and providing a pressure reference in the sending tube for determining by the cap an over-filled or an under-filled condition of the equipment tank.

In yet some other embodiments, the method further includes sending a pressure signal measured by the sensing tube to a pneumatic switch in the cap of the fuel valve assembly. Upon a determination that the pressure signal indicating the under-filled condition of the equipment tank, an open status of a valve controlling the fueling line of the head of the cap is maintained, for example, by the pneumatic switch. Upon a determination that the pressure signal indicating the over-filled condition of the equipment tank, the valve to close the fueling line of the head of the cap is actuated, for example, by the pneumatic switch using compressed air.

In some embodiments, a compressed air line is opened for closing a pneumatic valve of the manifold. The pneumatic valve is biased in a normally open position.

In some other embodiments, a compressed air line is closed for closing a pneumatic valve of the manifold. The pneumatic valve is biased in a normally closed position.

In a third general aspect, a system for delivering fuel to a fuel tank of equipment of a device at a work site includes a remote fuel bulk storage tank, an equipment fuel storage tank, and a fuel supply line extending between the remote fuel bulk storage tank and the oil field equipment fuel tank. The system further includes at least a valve disposed in the fuel supply line between the remote fuel storage tank and the equipment fuel storage tank for controlling a flow of the fuel in the fuel supply line. A mechanical sensor may be coupled to the equipment fuel storage tank to pneumatically detect a level of fuel inside the equipment fuel storage tank and pneumatically coupled to the valve to control its operation.

In a specific aspect, the mechanical sensor is a hydrostatic pressure sensor and further including one or more inversely oriented cylindrical containers vertically disposed into the equipment fuel storage tank for detecting the level of fuel.

In some embodiments, the valve may include a normally open pneumatic valve; a normally closed pneumatic valve; and a pneumatic control valve operable to control a flow rate.

In some other embodiments, the valve further includes a flow indicator indicating a status associated with one or more of the normally open pneumatic valve, the normally closed pneumatic valve, and the pneumatic control valve; and a manual valve.

In yet some other embodiments, the mechanical sensor is coupled via a coupler to a head of a cap, wherein the mechanical sensor is rotatable about the head by pivoting about the coupler such that the mechanical sensor is adjustable to maintain a vertical orientation forming a perpendicular angle with respect to the level of fuel.

In another specific aspect, the mechanical sensor is further coupled with a pneumatic switch disposed in the head of the cap, wherein the pneumatic switch reacts to an air pressure measured at the mechanical sensor by controlling a flow of compressed air.

In yet another specific embodiment, the flow of compressed air is operable to control the valve disposed in the fuel supply line between the remote fuel storage tank and the equipment fuel storage tank. In some embodiments, the head of the cap includes a fuel line connected to the fuel supply line for delivering fuel into the equipment storage tank.

BRIEF DESCRIPTION OF FIGURES

The accompanying drawings facilitate an understanding of the various embodiments.

Like numerals indicate like elements.

DETAILED DESCRIPTION

This disclosure presents devices, methods, and systems for delivering fuel. Fuel delivery for equipment at well sites is important because operations require more fuel than the equipment itself can carry. For example, pumpers, blenders, and other onsite equipment (often known as assets) are operated continuously for long periods of time in hydraulic fracturing operations. Personnel are excluded from the operation site (referred to as an exclusion zone) because accidents may involve high pressure equipment. The disclosed refueling devices, methods, and systems allow for refueling the assets without requiring personnel entering the exclusion zone and without electrical means of controlling the refueling process (i.e., increasing refueling rate, maintaining refueling rate, sending notification of remaining fuel, and/or shutting off refueling upon triggering events). The disclosed devices and systems are convenient to deploy and setup for various well site configurations. In one example, the refueling system includes a fuel carrying trailer, a manifold for distributing fuel and for controlling the distribution, and a refueling cap for coupling with fuel tanks of the assets and monitoring the fuel level thereof.

A manifold and a refueling cap may be transported on the fuel carrying trailer before deployment. Alternatively, the manifold may be integrated with the fuel carrying trailer in some embodiments. Alternatively, the manifold and the refueling cap may be stored and/or transported separately from the fuel carrying trailer.

As the manifold and the refueling cap use mechanical principles for controlling the refueling process, electronic controls and the costs and technical failures associated thereof are avoided. However, sensors and telemetry means may be used to monitor the operation status, such as refueling rate, remaining fuel, status of assets (e.g., distribution situations) without being integrated in any closed-loop controls. Unless specifically stated, terms such as sensors, switches, feedback, control, and other similar terms used herein refer to mechanical devices operating under mechanical principles for achieving certain operation effects.

Figure 1:
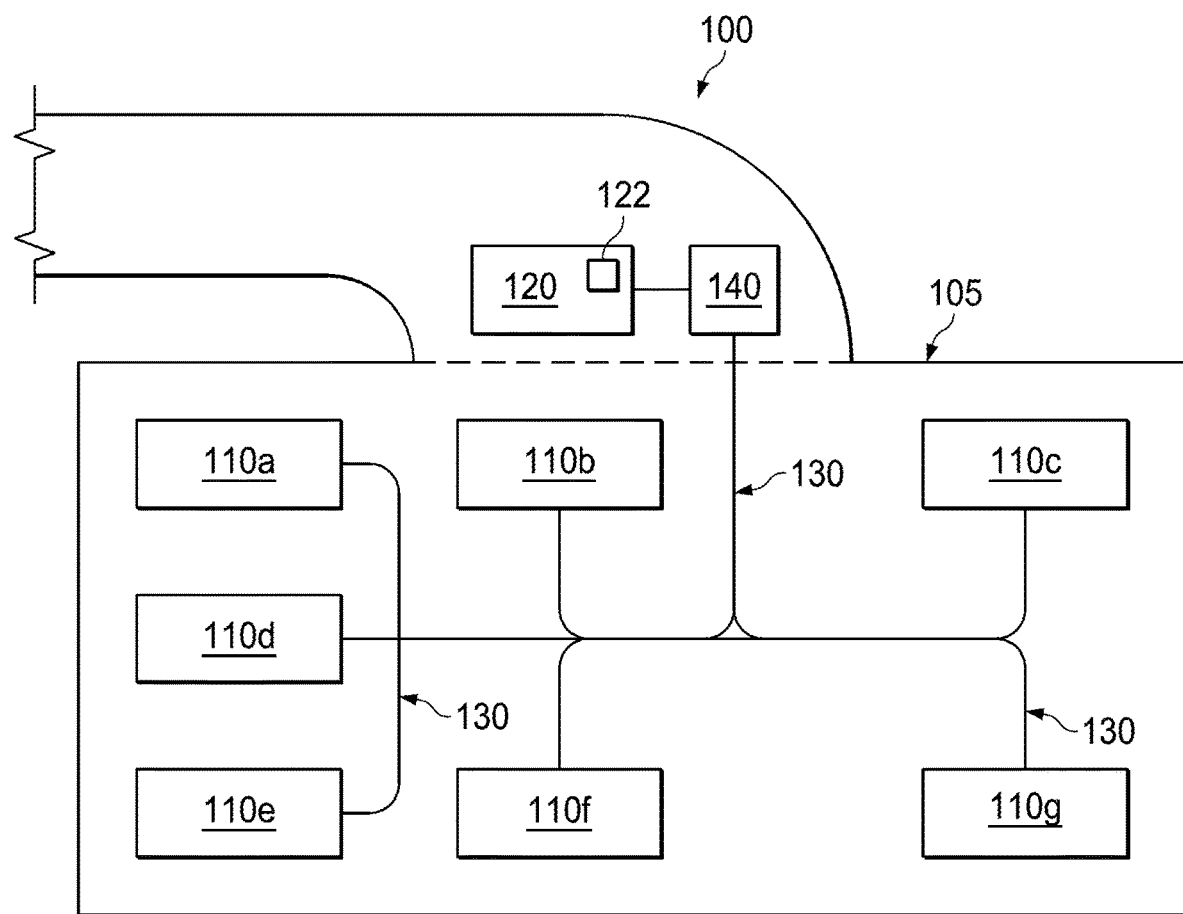
FIG. 1 is a block diagram of an embodiment of a fuel delivery system including an automatic refueling unit.

FIG. 1 is a block diagram of a fuel delivery system or refueling unit 120 employed at a work site 100 to continuously provide fuel to operating equipment or assets 110a-110g located in an exclusion zone 105. For example, the work site 100 may include operations of drilling, oil and gas production, including hydraulic fracturing, and any other operations that utilize heavy machinery. The exclusion zone 105 is an area that is presented with potentially hazardous conditions, such as for example, hazardous conditions associated with high-pressure equipment. Due to the hazardous operating conditions, personnel typically remain outside of the exclusion zone 105 during operation to avoid and otherwise minimize the risk of injury. As such, assets 110a-110g, such as, for example, equipment utilizing internal combustion engines, are typically unattended inside the exclusion zone 105 during operation.

In the embodiment illustrated in FIG. 1, the refueling unit 120 is coupled to the assets 110a-110g to continuously refuel the assets 110a-110g during operation. This enables personnel to remain outside the exclusion zone 105 while at the same time maintaining continuous operation of the assets 110a-110g. According to some embodiments, the refueling unit 120 may be a mobile, self-contained unit, such as, for example, a truck or trailer, that includes a large fuel container and related connections and hoses in order to distribute fuel, as discussed more fully below.

According to some embodiments, the refueling unit 120 is fluidly connected to the assets 110a-110g by fuel lines 130 and a valve or valve assembly 140. As explained in greater detail below, during operation, the valve assembly 140 automatically shuts-off the refueling process for assets 110a-110g when the asset fuel level reaches a predetermined level. Likewise, the valve assembly 140 permits refueling when the asset fuel level falls below a predetermined level. It should be understood that the refueling unit 120 may be deployed for all or some of the assets 110a-110g, depending on the layout of the work site and/or demands of the assets 110a-110g.

Figure 3:
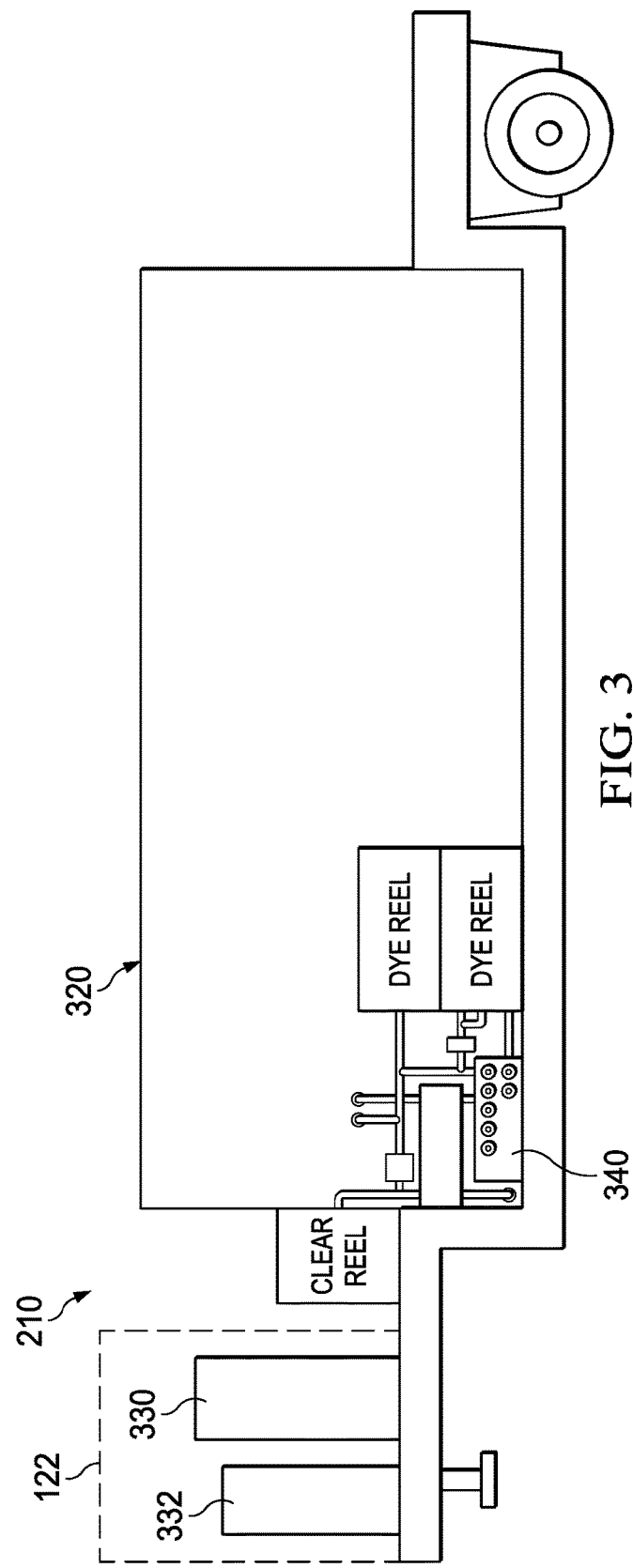
FIG. 3 is a diagram of a refueling unit.

As shown in FIG. 1, the fuel delivery system or refueling unit 120 and the valve assembly 140 are deployed outside of the exclusion zone 105. This allows personnel intervention at the refueling unit 120 or the valve assembly 140 during operation. To provide additional protection to the personnel or operator, the refueling unit 120 may include a safety compartment 122, such as an impact resistant room (e.g., a safe haven), to allow the personnel operate or monitor the operation of the refueling unit 120 or the valve assembly 140. In some embodiments, the refueling unit 120 and the valve assembly 140 may be positioned inside the exclusion zone 105, for example, when the refueling unit 120 has sufficient fuel to complete the refueling project and no personnel intervention is needed. An example of the safety compartment 122 is shown in FIG. 3.

Figure 2:
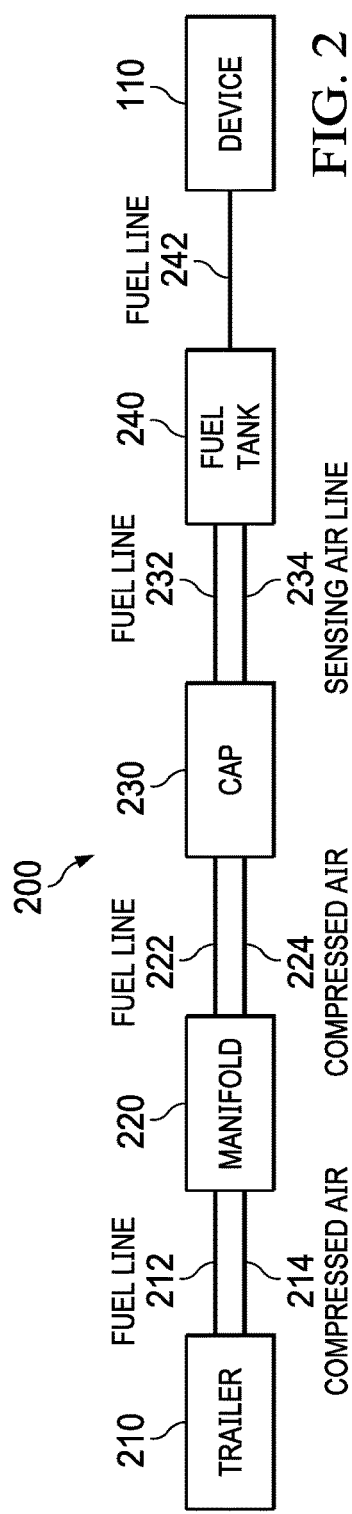
FIG. 2 is a block diagram illustrating an embodiment of the connection between a refueling unit and operating equipment of the fuel delivery system of FIG. 1.

Referring now to FIG. 2, a block diagram of the refueling unit 120 of FIG. 1 is illustrated. In the embodiment illustrated in FIG. 2, the refueling unit 120 includes a truck or trailer 210, a manifold 220, and a cap 230. In some embodiments, the manifold 220 may be permanently mounted inside or on the trailer 210, in other embodiments, the manifold 220 can be stored and transported within the trailer 210 but removed therefrom during operation. In other embodiments, the manifold 220, or at least a portion thereof, may be integrated with the cap 230. According to some embodiments, the trailer 210 includes a fuel storage tank 320 (FIG. 3) and is used to provide fuel to the manifold 220 via a fuel line 212. According to some embodiments and as discussed in greater detail below, the trailer 210 also provides a source of compressed air via a compressed air conduit 214 to the manifold 220, the operation of which will be discussed in greater detail below.

In operation, the manifold 220 is used to distribute fuel to one or more fuel caps 230 via a respective fuel line 222. Each cap 230 is coupled to on and otherwise encloses an opening of a fuel tank 240 for use by an asset 110a-110g. As discussed in greater detail below, the cap 230 includes a fuel line 232 to permit the flow of fluid into the fuel tank 240 from the fuel source. Additionally, the manifold 220 is connected to the cap 230 by two or more compressed air lines 224 to form a pneumatic control loop. For example, and as further described below, the manifold 220 can include one or more pneumatic valves to be actuated by the compressed air to control the fuel delivery the fuel tank 240 according pressure differentials.

According to some embodiments, the cap 230 interfaces with one or more sensing air lines 234 inserted into the fuel tank 240 for detecting pressure differences as a result of the changing fuel levels inside the fuel tank 240. For example, the fuel level may be measured against a reference for determining an underfilled condition, a normal filled range, or an overfilled condition. When refueling is desired as determined by the system 120, fuel will be delivered via the fuel lines 212, 222, and 232 to the fuel tank 240 via the cap 230, which provides the fuel to the asset 110.

FIG. 3 is a diagram illustrating a trailer 210. In the embodiment illustrated in FIG. 3, the trailer 210 includes a fuel tank or source 320 that can be transported to and from the desired site. In some embodiments, the fuel tank 320 includes two or more separate compartments for providing fuel for different purposes. For example, the fuel tank 320 may include a dedicated compartment/portion for running an on-board internal combustion engine, such as one for electric generator, air compressor, or other operation equipment. In other embodiments, the trailer 210 may be a truck having its own propulsion and steering mechanisms and the fuel tank 320 may provide separate compartments for these mechanisms. The fuel tank 320 also includes a large portion or compartment for refueling purposes, and may be referred to as a remote storage tank, a bulk supply tank, or a remote fuel bulk storage tank. The capacity of the fuel tank 320 may be designed to provide sufficient fuel for continuous operations of assets 110 with minimal personnel intervention during specific operations. Additionally, the trailer 210 includes one or more hose reels for storing hoses thereon.

With continued reference to FIG. 3, the trailer 210 further includes an air tank 330 for storing compressed air, an air compressor 332 and a dryer for removing condensation from the air supply, which his used to operate (i.e., open and close) one or more valves in the fuel delivery system 120. In some embodiments, the air tank 330 and the air compressor 332 may be enclosed in the safety compartment 122 that is providing a safe operation and/or monitoring space on the trailer 210. During operation, an operator may be available at the safety compartment 122 to adjust various types of manual valves and/or perform tools retrieval/deployment. The safety compartment 122 may include mechanical meters or digital displays for showing various operation parameters, such as remaining fuel level, fuel flow rate in each line, and/or compressed air pressures in each control line.

The trailer 210 also includes an output panel 340 having fittings for connecting to the fuel and air lines, such as, for example, the fuel line 212 and the air line 214. In some embodiments, the output panel 340 may also include flow meters or other measurement equipment for providing indication of the operation status. According to some embodiments, the output panel 340 includes one or more master valves for controlling an opening or closing of the connected fuel lines and air lines. The output panel 340 includes internal connections to the fuel tank 320 and the compressed air tank 330 to provide the stored fuel and compressed air to the fuel lines and air lines.

Figure 4:
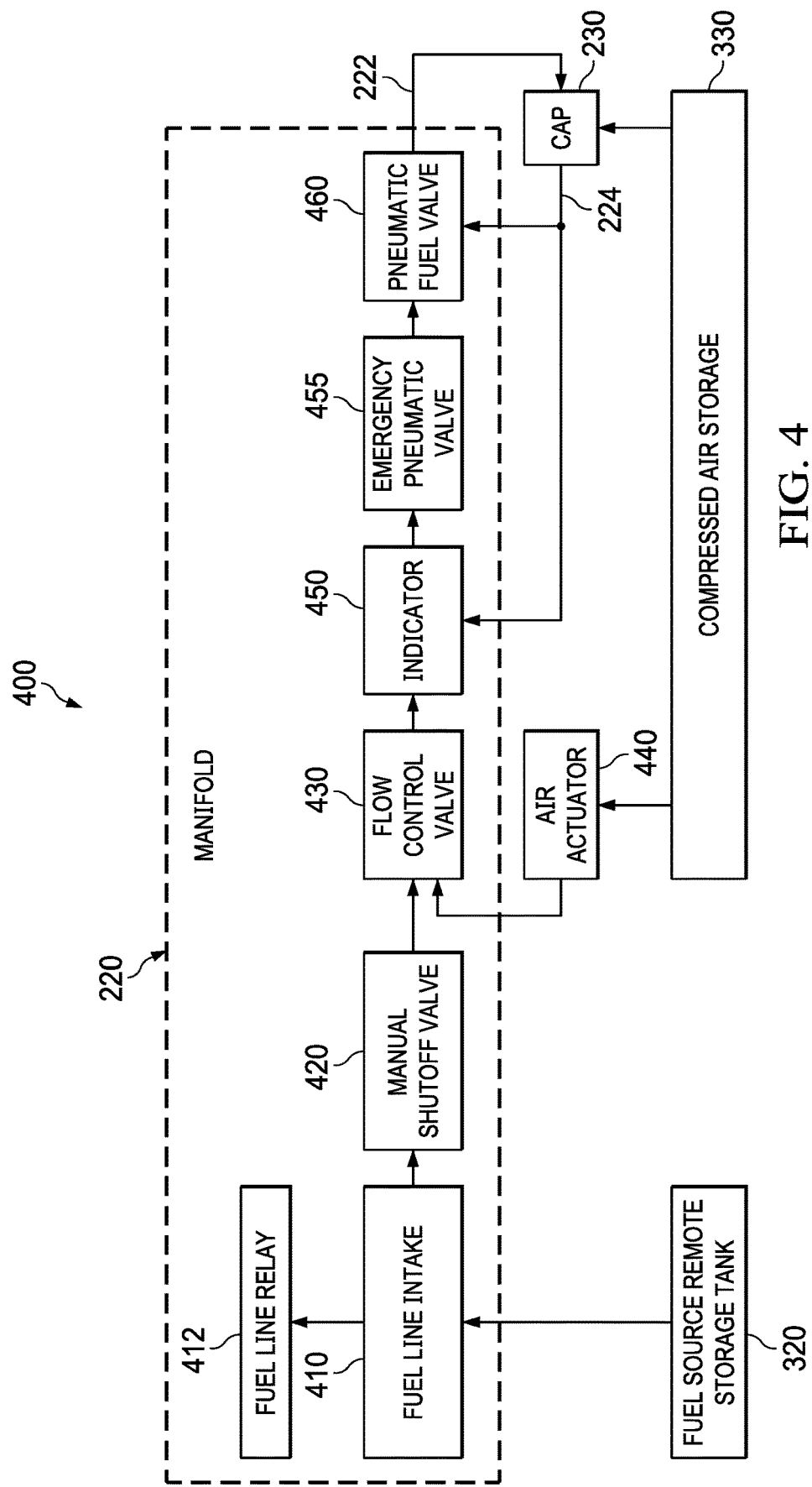
FIG. 4 is a diagram of a manifold for delivering and controlling fuel from the refueling unit to a cap device installed in the operation equipment.

Referring now to FIG. 4, an embodiment of the manifold 220 is illustrated. The manifold 220 includes a fuel line intake 410 for receiving fuel from the fuel storage tank 320. The fuel line intake 410 may be connected with a relay 412 for further distributing fuel, such as to another manifold 220 connected in series or in parallel to the present manifold 220. In some embodiments, the relay 412 allows two or more manifolds 220 to be positioned spaced apart from each other such that the manifolds 220 can be strategically placed relative to the assets 110.

As illustrated in FIG. 4, the manifold 220 further includes a manual shut-off valve 420, such as for example, a ball valve. The manual shut-off valve 420 enables a complete shut-off of further fuel delivery downstream, for example, when downstream equipment (such as the cap 230 and/or the asset 110) has not yet been completely deployed, set in place, or prior to disassembly of the system. In some embodiments, both the trailer 210 and the manifold 220 may include a manual shut-off valve. In other embodiments, the manual shutoff valve 420 may only be included in the manifold 220 and the fuel line connection to the remote storage fuel tank 320 may be permanent. In other embodiments, the manual shutoff valve 420 may only be on the remote storage fuel tank 320 instead of in the manifold 220.

In the embodiment illustrated in FIG. 4, the manual shut-off valve 420 is connected to a flow control valve 430 in series. In operation, the flow control valve 430 is used to adjust the flow rate of the fuel and can be a manual or automatically operated valve. As discussed more fully below, the operating status of the fuel delivery system 120 may be displayed by an operation indicator 450 downstream of the flow control valve 430.

In FIG. 4, the manifold 220 further includes an emergency pneumatic valve 455 and one or more fuel valves 460 connected downstream of the operation indicator 450. The emergency pneumatic valve 455 may be a secondary safety valve that operates in a substantially same manner as the one or more fuel valves 460 as a redundancy. The one or more fuel valves 460 may act as primary safety valves that automatically shut off when an unexpected incident occurs, including when an overfill condition occurs within the equipment tank 240. In some embodiments, the fuel valve 460 is a pneumatic valve configured between the open and closed positions based on a pressure detected via the cap 230 (air line connections not illustrated). In other embodiments, the pneumatic fuel valve 460 may be integrated with the cap 230 rather than the manifold 220. Structural features of the pneumatic fuel valve 460 are further discussed in FIGS. 6A-6D.

Although FIG. 4 illustrates the cap 230 and the air actuator 440 as separate components, in some implementations, the air actuator 440 may be part of the cap 230. In other embodiments, the air actuator 440 may be part of the flow control valve 430. In yet some other embodiments, the flow control valve 430 may be a manual flow control valve without any pneumatic control, for example, by allowing the pneumatic fuel valve 460 to intermittently shut-off for controlling any excessive fuel flow instead of reducing the refueling flow rate.

Figure 5:
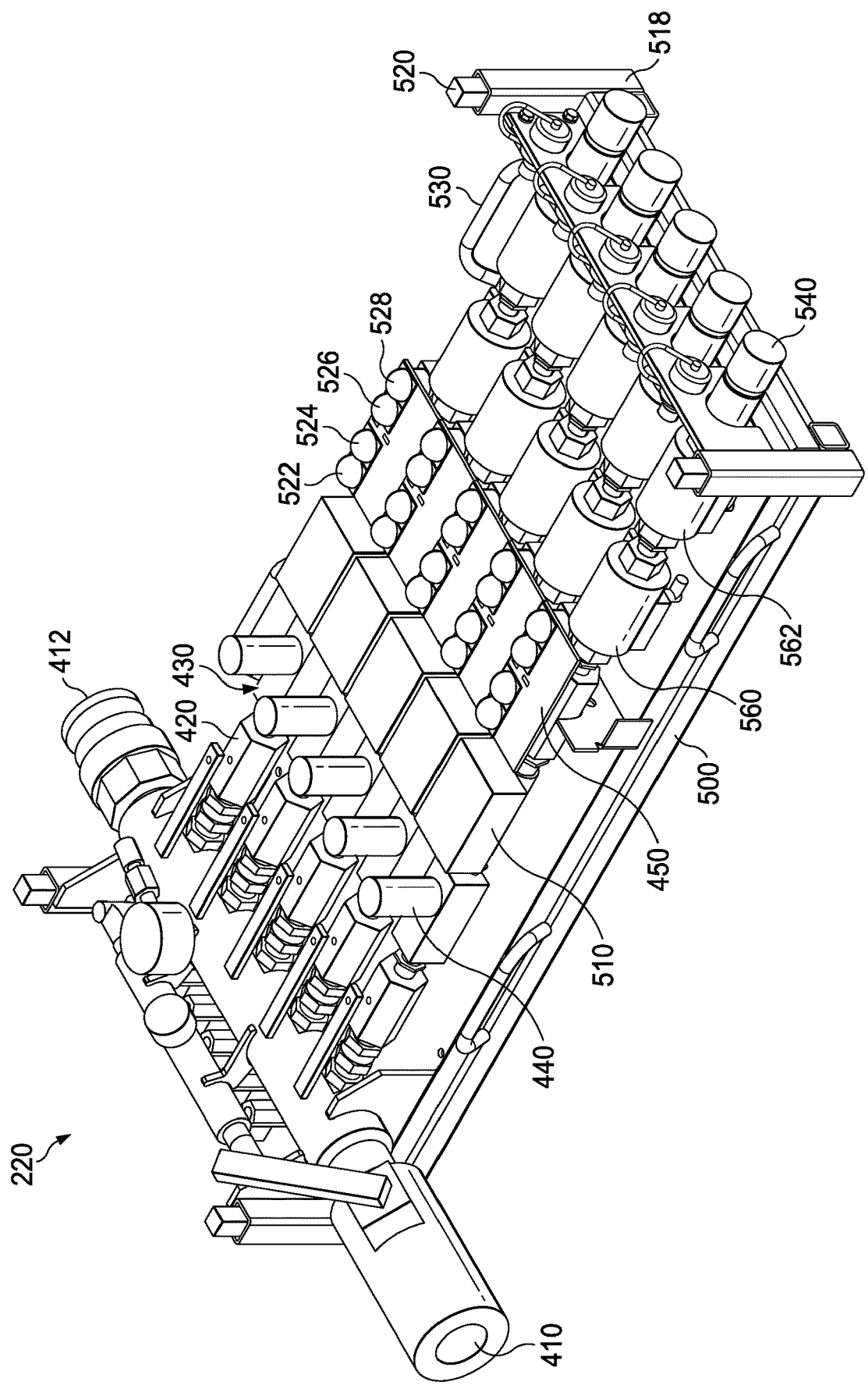
FIG. 5 is a perspective view of the manifold device of FIG. 4.

FIG. 5 is a perspective view of an embodiment of a manifold 220. The manifold 220 includes a manifold frame 500. The frame 500 includes one or more handles 530 (four illustrated). The manifold 220 may be carried or manipulated by one or two workers using the handles 530. The frame 500 further includes one or more stacking coupler male ends 520 and one or more corresponding stacking coupler female ends 518. The stacking coupler male and female ends 520 and 518 allow two or more manifold devices 220 be stacked on top of each other. For the bottom manifold devices 220, the stacking coupler female ends 518 may be coupled with an anchor of the trailer 210 during transportation. In some embodiments, the manifold 220 may have foldable or extendable feet to support the manifold 220 above ground level or any other support surface.

With continued reference to FIG. 5, the fuel line intake 410 and the relay 412 are secured on one end of the frame 500. The fuel line intake 410 may be in a tubular form having threads for receiving an incoming fuel line, and may include a valve operable to open and close the relay 412. The relay 412 may have a default closed position and opens only when a proper connection to another fuel line intake 410 of another manifold 220 is established.

In the embodiment illustrated in FIG. 5, five shut-off valves 420 are fluidly connected to the tubular structure between the fuel line intake 410 and the relay 412 so as to permit separate refueling of five different pieces of equipment. Although five shut-off valves 420 are illustrated, different numbers may be configured, such as by way of example, three or seven, depending on different customization needs. Each valve 420 is connected in series to a downstream flow control valve 430 that can be manually or automatically actuated to vary flow. Each flow control valve 430 is connected to a respective downstream flow meter 510, which measures the flow rate output by the flow control valves 430. In some embodiments, the flow meters 510 may have a display or indicator, either mechanical or electrical, onboard or through telemetry.

In the embodiment illustrated in FIG. 5, each flow meter 510 is connected with a downstream indicator system 450. In some embodiments, the indicator system 450 may include four display indicators 522, 524, 526, and 528, although it should be understood that a greater or fewer number of indicators. According to some embodiments, each display may be a mechanical device that changes output in response to a change in operating state or to indicate a condition. For example, the displays may output a particular color, symbol or sound representing normal air pressure for the system, a color, symbol or sound indicating that the system is filling, a color, symbol or sound indicating that the system is low on fuel and/or the system of overfilling.

Each indicator 450 is connected to a normally closed valve 560 and a normally open valve 562 further downstream from the normally closed valve. The valves 560 and 562 correspond to the pneumatic fuel valve 460 in the diagram 400 of FIG. 4. The valves 560 and 562 ensure that only when proper pneumatic control connections are set up for the trailer 210 and the cap 230, would the valves 560 and 562 both be open. Details of the operations of the valves 560 and 562 are shown in FIGS. 6A-6D and are discussed in further detail below. The manifold 220 further includes an output 540 for each fuel line. As explained in greater detail below, the output 540 is fluidly connected to the normally open valve 562 and is coupleable with downstream fuel lines (not shown).

Figure 6A:
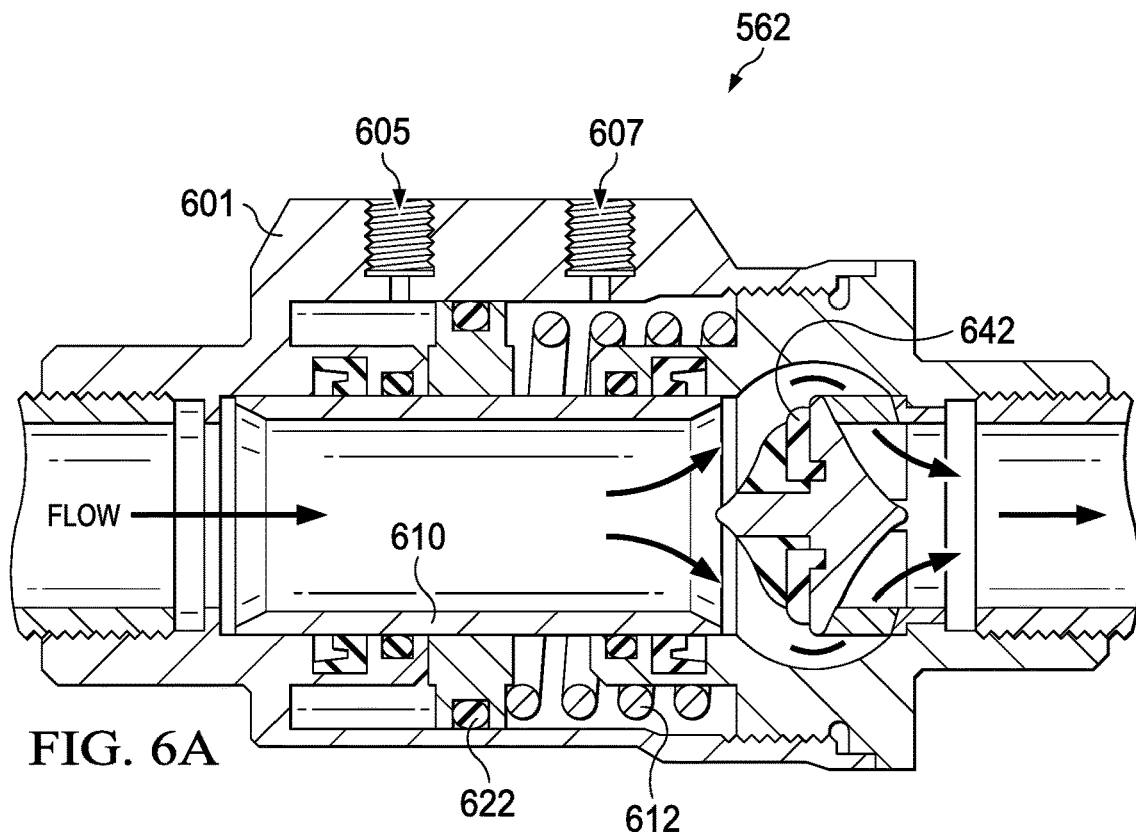
FIGS. 6A-6D are detail views of a portion of the manifold device of FIG. 5.
Figure 6B:
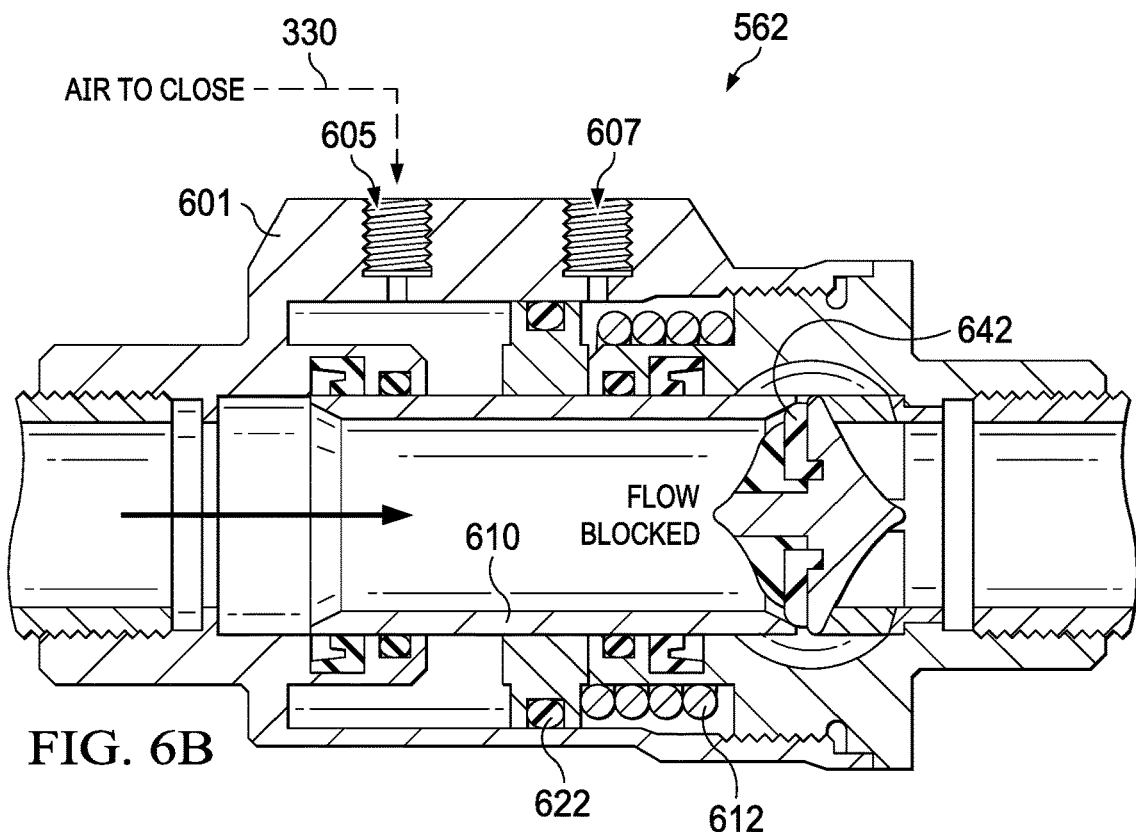
Figure 6C:
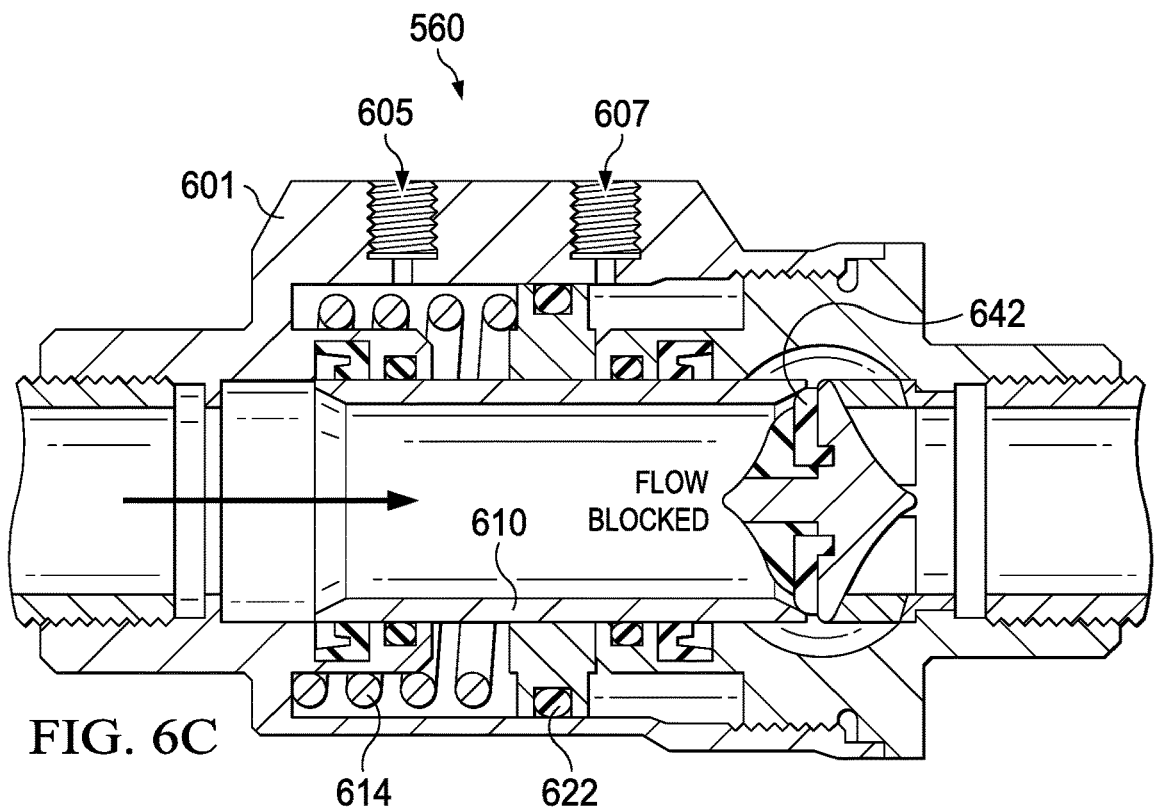
Figure 6D:
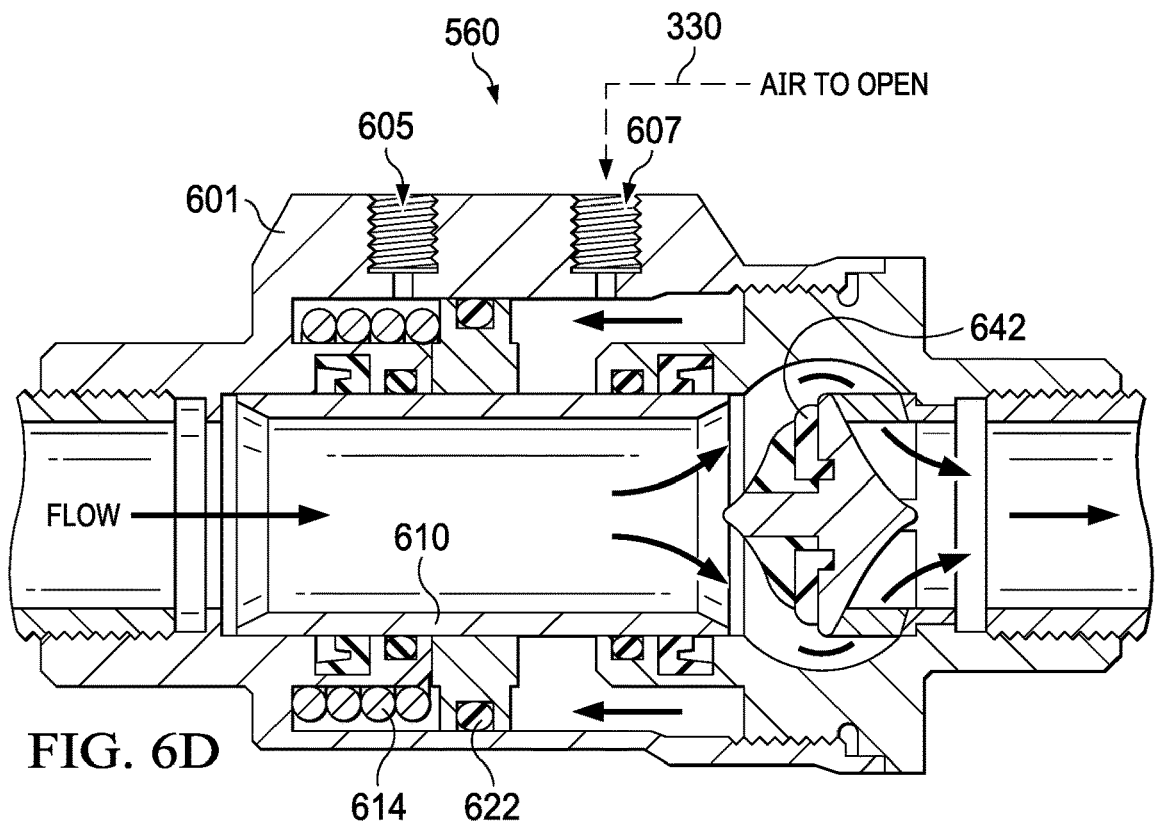

FIGS. 6A-6D illustrate the operation states of the valves 560 and 562. FIG. 6A is a cross-sectional side view of the normally open valve 562 in an open position. FIG. 6B is a cross sectional side view of the normally open valve 562 in a closed position under pneumatic actuation. FIG. 6C is a cross sectional side view of the normally closed valve 560 in a closed position. FIG. 6D is a cross sectional side view of the normally closed valve 560 in an open position under pneumatic actuation.

Turning first to FIG. 6A, the normally open valve 562 includes a housing 601. The housing 601 includes a first air inlet 605 and a second air inlet 607. A sliding tube 610 is situated within the housing 601 and is configured to move between an open position and a closed position. The sliding tube 610 sealingly divides the internal volume of the housing 601 with a sliding seal 622. The sliding tube 601 is biased toward the open position by a biasing member 612. In the illustrated embodiment, the biasing member 612 is a compressed helical spring exerting a bias force separating the sliding member 610 from the seating seal 642. During operation, the air inlets 605 and 607 may receive compressed air of a similar pressure, such that the biasing member 612 sets the sliding tube 610 to the default open position.

Upon an occurrence of certain events, however, as shown in FIG. 6B, the air pressure received through the first air inlet 605 becomes greater than the air pressure received through the second air inlet 607 such that the pressure differential results in an actuation force overcoming the biasing force exerted by the biasing member 612, until the sliding tube 610 is sealingly engaged with the seating seal 642 to completely shut off the normally open valve 562.

Turning to FIGS. 6C and 6D, the operation of the normally closed valve 560 is the opposite of that of the normally open valve 562. This is achieved by placing a second biasing member 614 on the opposite side of the biasing member 612 about the sliding tube 610. As shown in FIG. 6C, the biasing member 614 exerts a bias force sealing the sliding tube 610 onto the seating seal 642 absent pneumatic actuation. This provides a safe shut-off when the compressed air supply is accidentally lost, such as when the system is accidentally shut-off or disturbed.

During normal operations, however, as shown in FIG. 6D, compressed air is provided at the second air inlet 607 to create a pressure differential that results in an actuation force overcoming the biasing force exerted by the biasing member 614, until the sliding tube 610 is moved away from the seating seal 642 to allow the fuel flow through the normally closed valve 560. In some embodiments, the compressed air provided at both air inlets 605 of the valves 560 and 562 and the compressed air provided at both air inlets 607 of the valves 560 and 562 may be shared, coupled, or the same, such that the pneumatic actuation may be simplified. In other embodiments, when accurate control may be desired, the air inlets 605 and 607 of each valve 560 or 562 may receive compressed air independently.

According to some embodiments, the flow control valve 430 may be operated using similar principles as the valves 560 and 562 but with mechanisms of different configurations. That is, the flow control valve 430 may receive a pressure differential that actuates or adjusts the opening of the valve, except that the flow control valve 430 would not have a default closed or open position like the valves 560 and 562. As such, the manifold 220 may be pneumatically controlled to operate from maximum open status to complete shut-off status, based on one or more compressed air lines that are operable to produce a pressure differential in the valves. The pneumatic sensing and control are further presented below with the cap 230.

Figure 7:
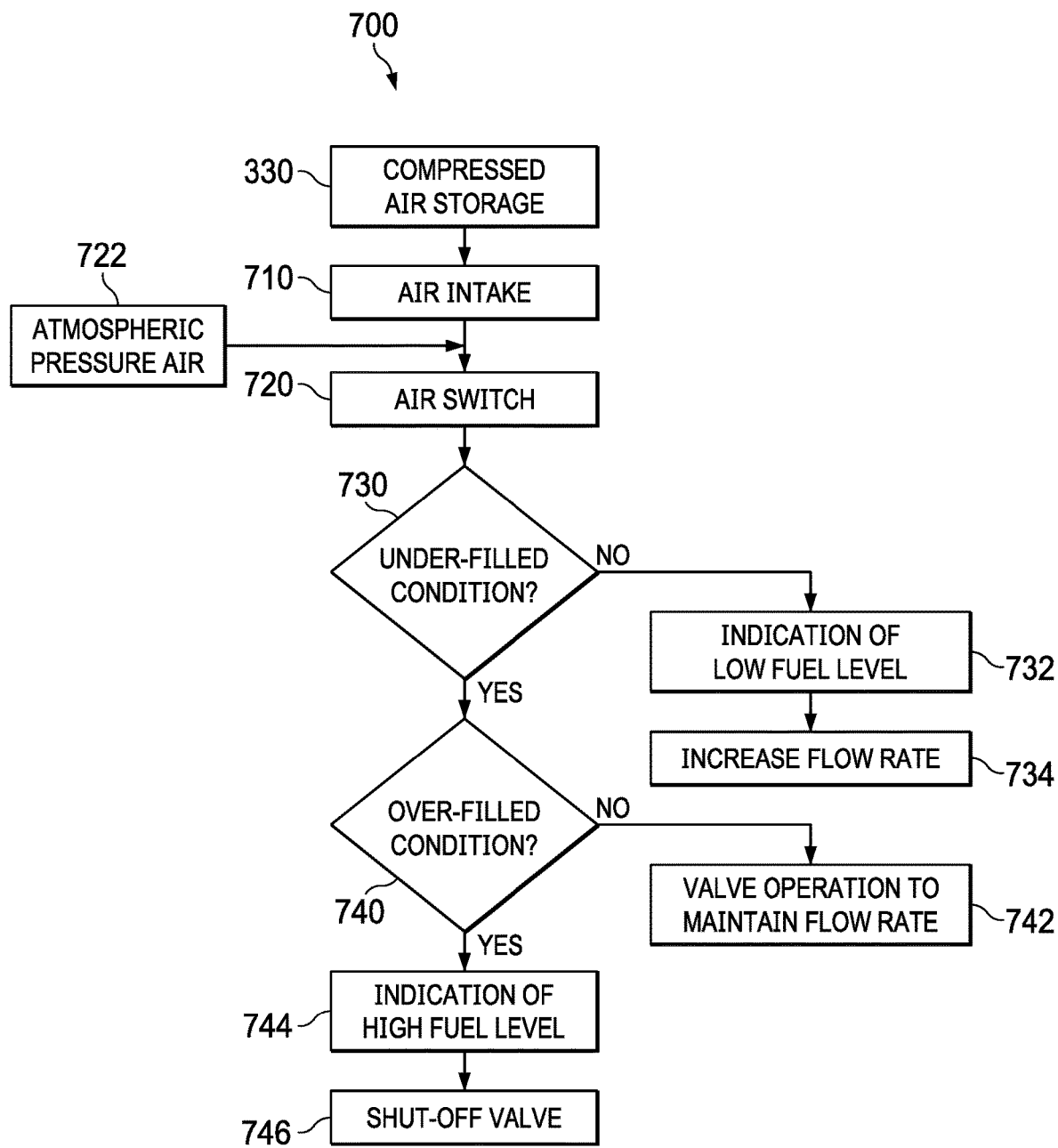
FIG. 7 is a flow diagram illustrating operation of a cap device for delivering and controlling fuel from the example manifold to a fuel tank of the operation equipment.

FIG. 7 is a block diagram 700 of an embodiment of the cap device 230 for delivering and controlling fuel to a fuel tank 240 of the operation equipment 110. In FIG. 7, the cap 230 includes an intake 710 for receiving compressed air, such as from the compressed air tank 330 of the trailer 210. The cap 230 further includes a plurality of switches 720 that measures changes of pressure therein. For example, the switch 720 may include one or more pressure tubes or similar sensors inserted into the equipment tank 240 to measure the fuel level therein. The pressure tubes may be initially provided with an atmospheric pressure 772 connected to the switch 720.

The one or more pressure tubes measure a variable pressure as the fuel level changes. In the situation when the switch 720 determines that the fuel level is under a minimum level when performing a comparison logic 730, the switch 720 determines that the equipment tank 240 is underfilled and returns a pressure signal for indicating the low fuel level at 732, such as at the indicator 524. In response, the flow control valve 430 may be moved to an open position to permit flow of fuel at 734.

When the switch 720 determines that the fuel level is above the minimum level when performing the comparison logic 730, the switch 720 further performs a comparison logic 740 to determine if the fuel level is above the maximum allowable fuel level. If the fuel level is not above the maximum allowable fuel level, the switch 720 would not pneumatically actuate the manifold 220 and maintains the present flow rate at 742. If the fuel level exceeds the maximum allowable fuel level, the switch 720 determines that the equipment tank 240 is overfilled and returns a pressure signal for indicating the overfilled fuel level at 744, such as at the indicator 526. In response, the flow control valve 430 may be moved to a closed position to accordingly decrease the flow rate at 746. Detail implementations of the diagram 700 are provided below.

Figure 8:
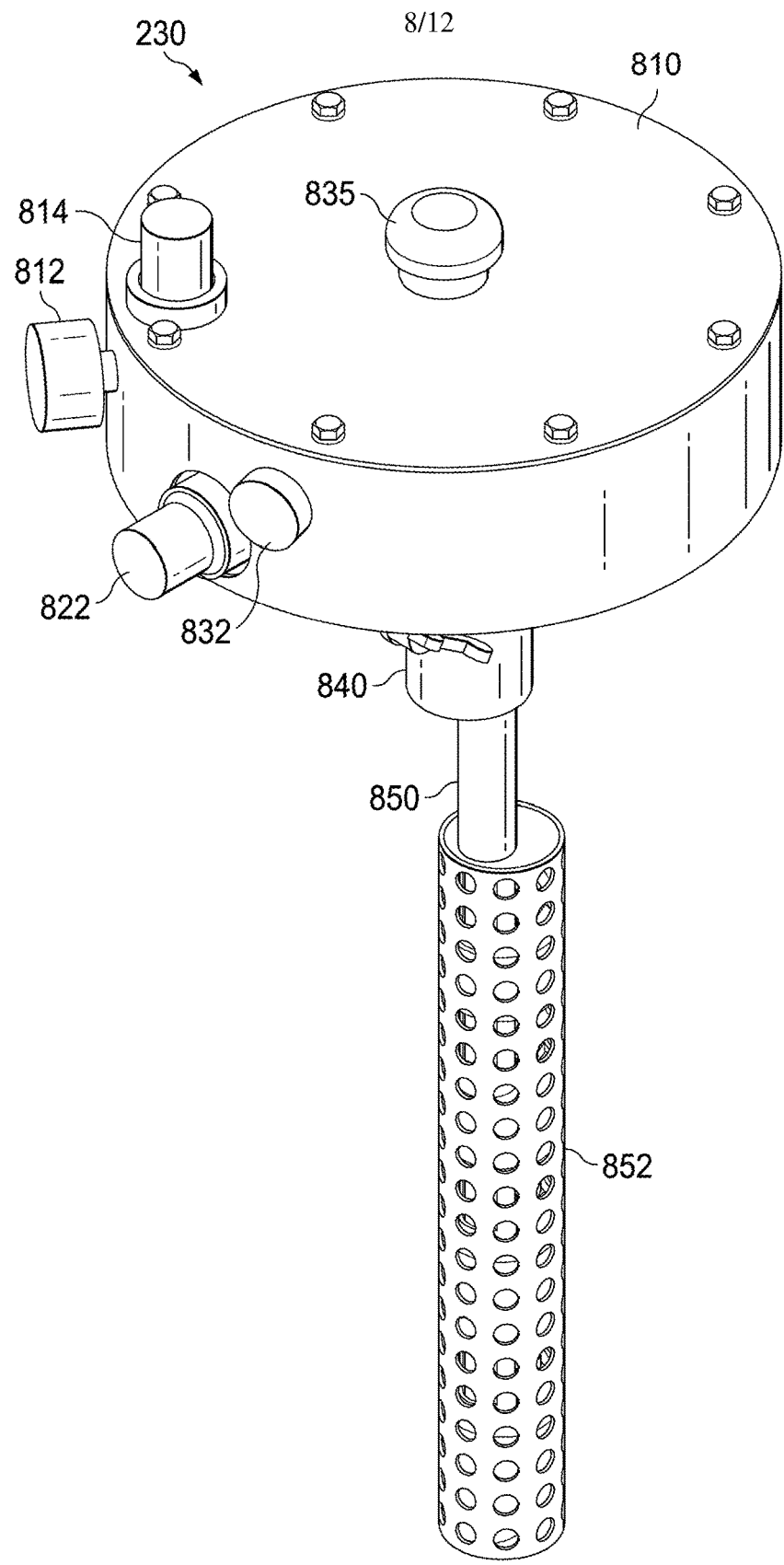
FIG. 8 is a perspective view of an embodiment of a cap device.

FIG. 8 is a perspective view of an embodiment of the cap device 230 of FIG. 7. The cap 230 includes a head 810 and a mechanical sensor 850 removably coupleable to the head 810 by a coupler 840. In the embodiment illustrated in FIG. 8, the mechanical sensor 850 is protected by a guard sleeve 852 and may be vertically inserted and partially submerged into the fuel of the equipment tank 240. The coupler 840, in addition to allowing for detachment of the sensor 850, allows an angular adjustment between the mechanical sensor 850 and the head 810. For example, oftentimes the opening in the existing capped opening for receiving fuel on the side of the tank and thus, the sensor 850 would be inserted at an angle relative to the fuel surface. The coupler 840 allows the mechanical sensor 850 to rotate about the head 810 such that the mechanical sensor 850 can be adjusted to be substantially perpendicular to the fuel surface. In addition to allowing angular adjustment, since openings of the equipment tank can vary in size, the head 850 can be designed of various sizes. Once the proper size head 850 is selected, the sensor 850 can be attached thereto.

The head 810 further includes a filter with gauge 812, an air return line fitting 814, a fuel line intake fitting 822, and a compressed air intake fitting 832. The fuel line intake 822 receives an upstream fuel line connected with the output 540 of the manifold 220 and delivers the incoming fuel to the equipment fuel tank 240. The filter with gauge 812 provides a filtering function and a display of the flow rate, pressure, or other measurements of the incoming fuel and/or compressed air. The compressed air intake fitting 832 is connected with a compressed air line as part of the pneumatic control loop of the manifold 220. The compressed air is used in one or more switches inside the head 810 and exits the air return line fitting 814 in response to changes in fuel level. The head further includes an air vent 835 for accommodating changes in fuel level in the equipment tank 240 such that atmospheric pressure is maintained outside of the mechanical sensor 850. Details of the mechanical sensor 850 are shown in FIGS. 9A-9D; and details of the switches inside the head 810 are shown in FIG. 9E below.

Figure 9A:
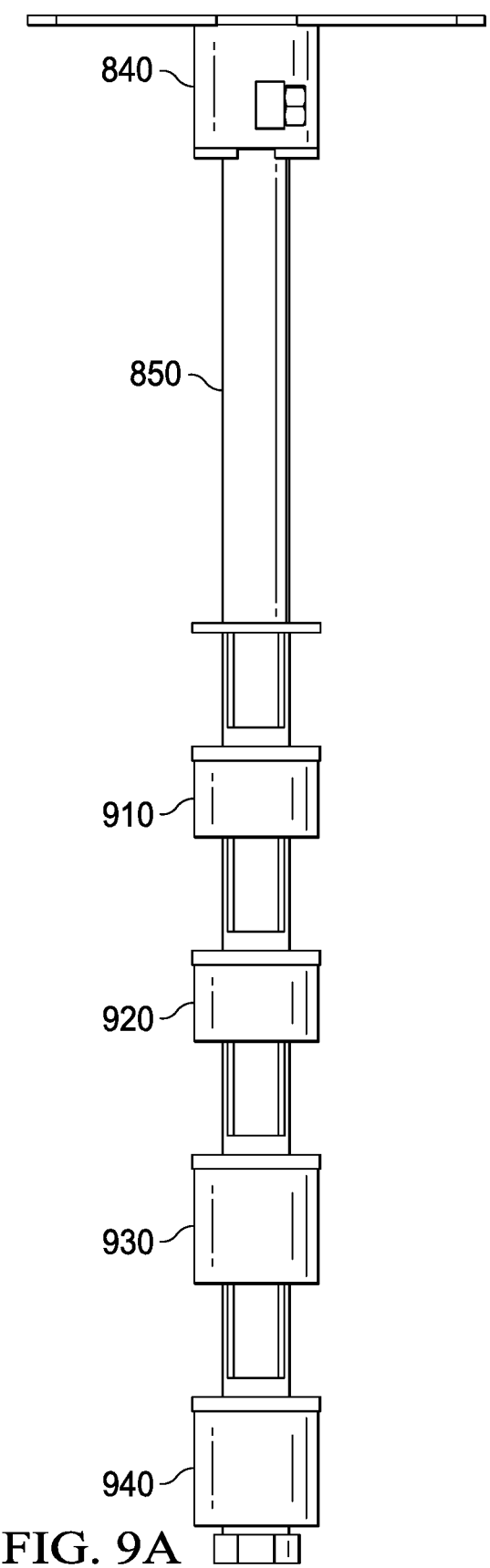
FIGS. 9A-9E are detail views of portions of the cap device of FIG. 8.
Figure 9B:
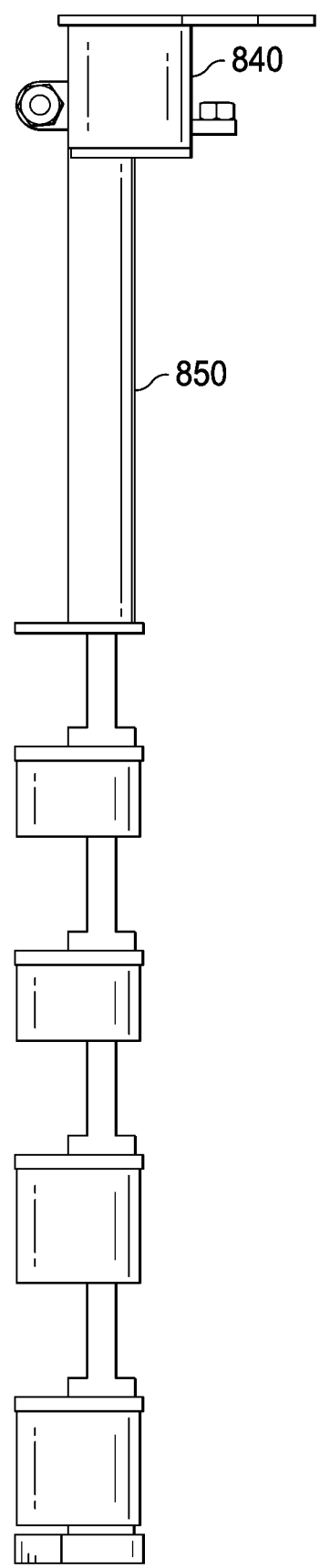
Figure 9C:
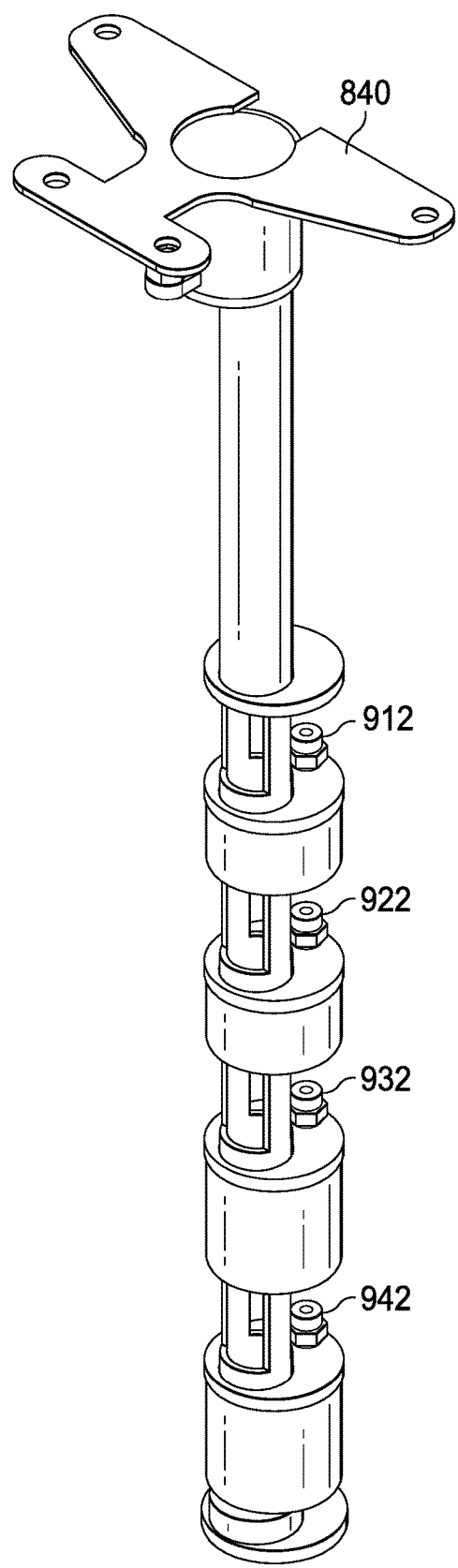
Figure 9D:
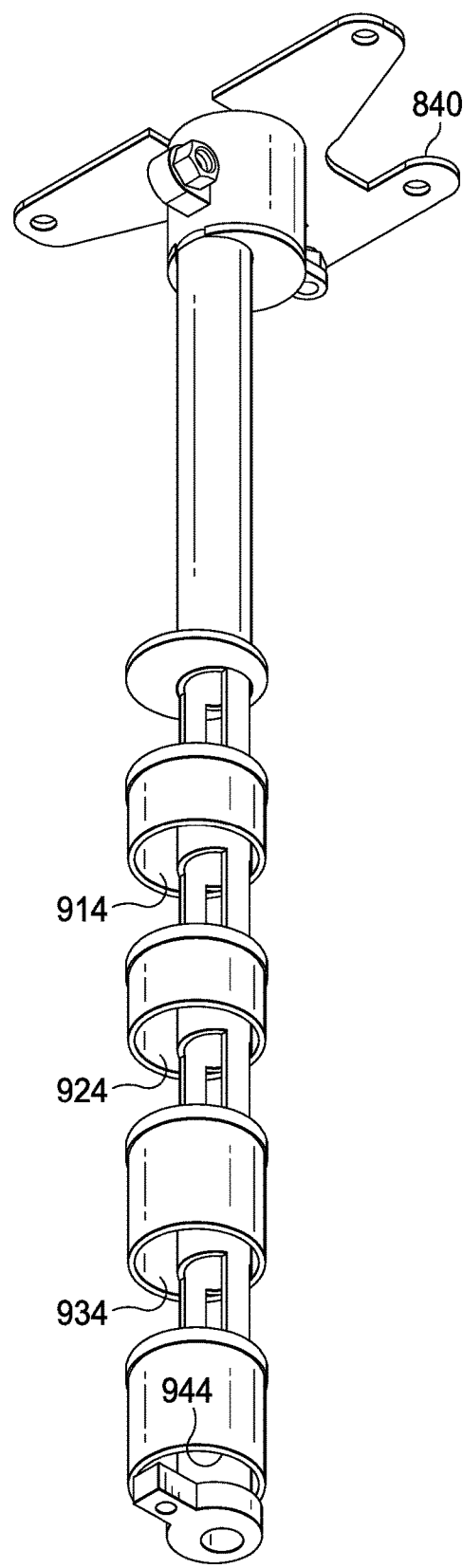
Figure 9E:
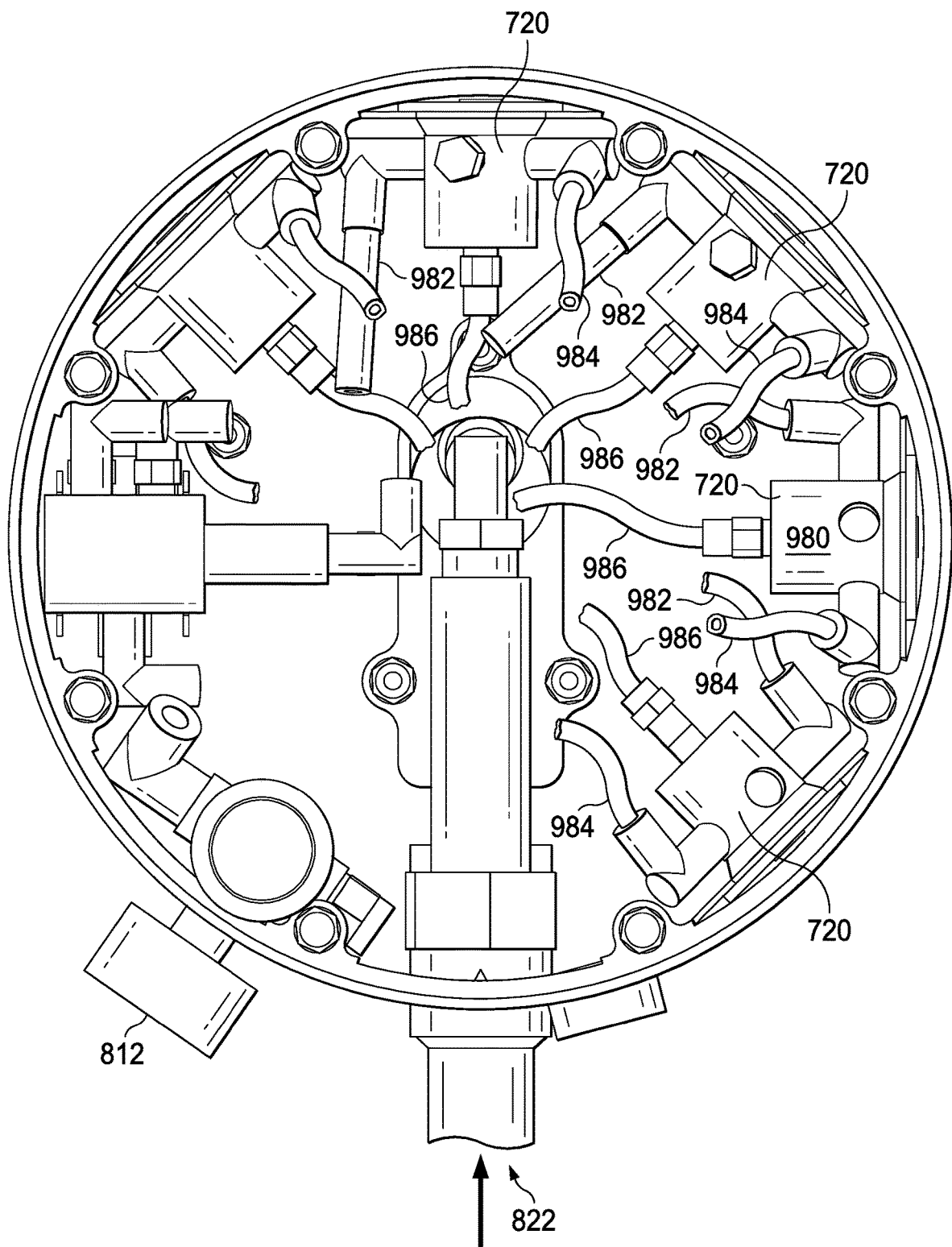

FIG. 9A is a front view of the mechanical sensor 850; FIG. 9B is a side view of the mechanical sensor 850; FIG. 9C is a perspective top view of the mechanical sensor 850; and FIG. 9D is a perspective bottom view of the mechanical sensor 850. In the illustrated embodiment, the mechanical sensor 850 includes four inversely oriented cups (or otherwise shaped containers) 910, 920, 930, and 940. For example, each of the cups 910-940 may be of a cylinder with a sealed top, of predetermined diameter and/or depth. Each of the cups 910-940 may include a pressure tube (not illustrated) connected at the sealed top connected at the respective pressure sensing tube connectors 912, 922, 932, and 942. During operation, before the bottom edge each of the cups 910-490 is submerged under the fuel level, the pressure tube connected at the connectors 912, 922, 932, and 942 would measure the atmospheric pressure. When the bottom cup 940 is submerged under the fuel level and continues to be lowered under the fuel level, the pressure tube connected to the connector 942 would start measuring an increased air pressure as the fuel fills the pressure sensing chamber 944. Similarly, as the cups 930, 920, and 910 vary their relative positions to the fuel level, the corresponding pressure tubes connected at the connectors 932, 922, and 912 can provide pressure measurements indicating the fuel levels and changes thereto.

According to one embodiment, the mechanical sensor 850 may be calibrated to consider a fuel level submerging the cups 930 and 940, and therefore fully or partially filling the chambers 944 and 934, but not reaching the cups 920 and 910. The mechanical sensor 850 may further be calibrated to consider that a fuel level below the cup 930 is considered underfilled, and above the cup 920 as being overfilled. In other embodiments, however, the mechanical sensor 850 may be calibrated to consider that a fuel level below the cup 940 is consider underfilled, and above the cup 910 as being overfilled. Different calibrations may result in different actuations by the switches in the head 810.

In an overfilled situation, for example, the pressure sensing chambers 914, 924, 934, and 944 may all be fully or partially filled with fuel and the four pressure tubes have respectively increased air pressure. Such an increase in the sensing pressure may trigger the switch to shut-off the manifold 220. In an underfilled situation, for example, the pressure sensing chambers 914, 924, 934, and 944 may all be exposed in atmospheric pressure. Thus the sensing pressure may be at its lowest levels and the switch in the head 810 would not actuate any valves in the manifold 220 to change its default refueling operation. The sensitivity of the mechanical sensor 850 and the corresponding actions by the switch in the head 810 may be adjusted depending on the type of fuel, the environment (such as temperature, altitude, etc.) and the desired measurement sensitivity for the closed loop pneumatic control. In normal operation, when the fluid level falls below cup 930, the system is calibrated to open to allow fluid flow into the fuel tank. As the fluid level inside the tank rises and reaches cup 920, the system is calibrated to close the fuel valve 562 to stop filling. The process repeats when the fluid level inside the tank falls below cup 920.

In the event here is a malfunction and fluid continues to fall below cup 930, cup 940 is positioned to sense that fluid is not filling within the tank and a signal or other warning can be generated. Likewise, if the fluid level reaches cup 910, an overfill condition is approaching and the emergency shut-off valve 420 can be closed to prevent an overflow.

In some embodiments, the cups 910, 920, 930, and 940 are all made of robust metal materials not susceptible plastic deformation during normal use of the cap 230. For example, the mechanical sensor 850 may be made of stainless steel throughout and the cups 910, 920, 930, and 940 are welded onto a stem. As such, the measurement precision can be realized for accurate pneumatic control.

Although four distinct cups 910, 920, 930, and 940 are illustrated, different number, different length, and different diameters of pressure sensing containers may be used in the mechanical sensor 850. For example, in some embodiments one cup may be sufficient to provide a reliable indication of the fuel level measurement. In other embodiments, more than four cups may be necessary to provide an accurate pressure measurement.

Figure 10:
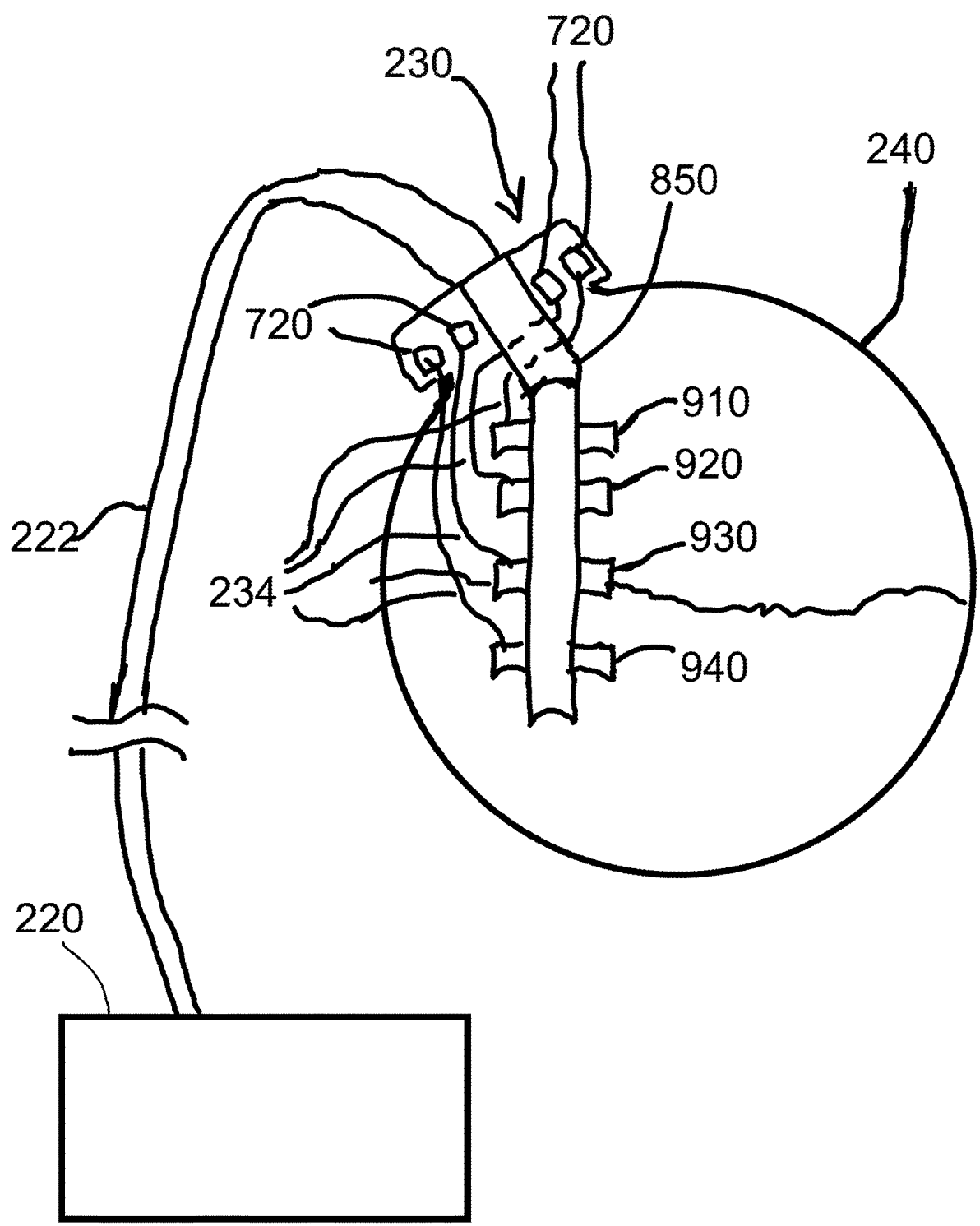
FIG. 10 is a simplified section view of the cap device of FIG. 8 installed on a fuel storage tank.

FIG. 10 illustrated the fuel cap 230 secured to the fuel tank 240 with cups 930 and 940 being submerged by the fuel stored within the tank 240. The sensor 850 has been oriented such that it is substantially perpendicular to the fuel surface, as previously discussed.

Turning now to FIG. 9E, FIG. 9E presents an example component layout of the underside of the head 810 of the cap 230. The head 810 includes one or more switches 720 (in the illustrated example, one switch 720 for each of the four cups 910, 920, 930, and 940). The switch 720 may have an air switch housing for receiving an incoming compressed air via the incoming line 982. A pressure sensing tube 986 may extend from each switch 720 into one of the four cups 910, 920, 930, and 940. In FIG. 9E, the switch 720 includes an output 984 connected to the manifold 220 for the closed loop pneumatic control. During operation, pressure changes measured by the switch 720 via the pressure tube 986 cause the switch to output different levels of compressed air, which causes pneumatic actions of valve 562 (or valve 560 in an overfill condition), such as described in the diagrams 400 and 700.

The foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose.

In the specification and claims, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s), as defined solely by the appended claims. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A system for delivering fuel to a fuel tank of a device at a work site, the system comprising:
   a remote fuel bulk storage tank;
   a valve assembly configured to be coupled to the fuel tank of the device, the fuel tank having a level of fuel changing due to operation of the device;
   a fuel supply line extending between the remote fuel storage tank and the valve assembly;
   a pneumatic valve disposed in the valve assembly, the pneumatic valve operable between a closed position, to prevent a flow of fuel from exiting the valve assembly, and an open position, to enable a flow of fuel through the valve assembly;
   wherein the valve assembly comprises one or more pressure tubes and one or more corresponding cups coupled the one or more pressure tubes so as to detect changes in the level of fuel in the fuel tank between an under-filled condition and an overfilled condition inside the fuel tank, the cups having a sealed top and an opposed open ended bottom forming a pressure sensing chamber such that in response to the fuel in the fuel tank reaching an overfilled position and at least partially filling the pressure sensing chamber, a pressure switch actuates the pneumatic valve to the closed position; and in response to an under-filled condition, the pressure switch maintains the pneumatic valve in the open position.

2. The system of claim 1, wherein the one or more pressure tubes are coupled to one or more respective pressure switches.

3. The system of claim 1, wherein the valve assembly comprises a manifold disposed between the bulk storage tank and the pressure switch.

4. The system of claim 1, wherein the valve assembly is at least partially formed in a cap.

5. The system of claim 1, further comprising a manually operable valve disposed between the remote fuel bulk storage tank and the pneumatic valve.

6. The system of claim 1, wherein at least one of the one or more pressure tubes detects an overfilled fuel condition and at least another pressure tube detects an under-filled fuel condition.

7. A method for delivering fuel, the method comprising:
   coupling a bulk supply tank to an equipment tank via a fuel valve assembly;
   securing the fuel valve assembly partially within the equipment tank, the fuel valve assembly comprising one or more pressure tubes and one or more corresponding cups coupled the one or more pressure tubes, the cups having a sealed top and an opposed open ended bottom forming a pressure sensing chamber, the pressure tubes and cups adapted to measure pressures associated with different fuel levels inside the equipment tank;
   providing a pneumatic control valve actuated in response to conditions detected by the pressure tubes to maintain a fuel level in the equipment tank tank between an under-filled condition and an overfilled condition.

8. The method of claim 7, wherein coupling the bulk supply tank to the equipment tank via the fuel valve assembly comprises coupling the bulk supply tank to a manifold of the fuel valve assembly and coupling the manifold of the fuel valve assembly to a cap of the fuel valve assembly, wherein the cap extends into the equipment tank.

9. The method of claim 8, wherein securing the fuel valve assembly partially within the equipment tank comprises vertically extending a sensing tube of the cap of the fuel valve assembly into the equipment tank and securing a head of the cap of the fuel valve assembly to an opening of the equipment tank, wherein the head of the cap carries a fueling line for delivering fuel into the equipment tank.

10. The method of claim 9, wherein vertically extending the sensing tube of the cap of the fuel valve assembly into the equipment tank comprises submerging a portion of the sensing tube into a level of fuel of the equipment tank and providing a pressure reference in the sending tube for determining by the cap an over-filled or an under-filled condition of the equipment tank.

11. The method of claim 10, further comprising sending a pressure signal measured by the sensing tube to a pneumatic switch in the cap of the fuel valve assembly;
   in response to an under-filled condition of the equipment tank, maintaining, by the pneumatic switch, an open status of a valve controlling the fueling line of the head of the cap; and
   in response to an over-filled condition of the equipment tank, actuating, by the pneumatic switch using compressed air, the valve to close the fueling line of the head of the cap.

12. The method of claim 11, wherein actuating, by the pneumatic switch using compressed air, the valve to close the fueling line of the head of the cap comprises opening a compressed air line for closing a pneumatic valve of the manifold, wherein the pneumatic valve is biased in a normally open position.

13. The method of claim 11, wherein actuating, by the pneumatic switch using compressed air, the valve to close the fueling line of the head of the cap comprises closing a compressed air line for closing a pneumatic valve of the manifold, wherein the pneumatic valve is biased in a normally closed position.

14. A system for delivering fuel to a fuel tank of equipment of a device at a work site, the system comprising:
   a remote fuel bulk storage tank;
   an equipment fuel storage tank;
   a fuel supply line extending between the remote fuel bulk storage tank and the equipment fuel storage tank;
   a valve disposed in the fuel supply line between the remote fuel bulk storage tank and the equipment fuel storage tank for controlling a flow of the fuel in the fuel supply line; and
   a mechanical sensor coupled to the equipment fuel storage tank to pneumatically detect a level of fuel inside the equipment fuel storage tank and pneumatically coupled to the valve to control its operation, the mechanical sensor including at least one cup coupled to at least one pressure tube, the at least one cup having a sealed top and an opposed open ended bottom forming a pressure sensing chamber, the pressure tube and cup adapted to measure pressures associated with different fuel levels inside the equipment fuel tank.

15. The system of claim 14, wherein the mechanical sensor is a hydrostatic pressure sensor and further comprising one or more inversely oriented cylindrical containers vertically disposed into the equipment fuel storage tank for detecting the level of fuel.

16. The system of claim 14, wherein the valve comprises:
   a normally open pneumatic valve;
   a normally closed pneumatic valve; and
   a pneumatic control valve operable to control a flow rate.

17. The system of claim 16, wherein the valve further comprises:
    a flow indicator indicating a status associated with one or more of the normally open pneumatic valve, the normally closed pneumatic valve, and the pneumatic control valve; and
    a manual valve.

18. The system of claim 14, wherein the mechanical sensor is coupled via a coupler to a head of a cap, wherein the mechanical sensor is rotatable about the head by pivoting about the coupler such that the mechanical sensor is adjustable to maintain a vertical orientation forming a perpendicular angle with respect to the level of fuel.

19. The system of claim 18, wherein the mechanical sensor is further coupled with a pneumatic switch disposed in the head of the cap, wherein the pneumatic switch reacts to an air pressure measured at the mechanical sensor by controlling a flow of compressed air.

20. The system of claim 19, wherein the flow of compressed air is operable to control the valve disposed in the fuel supply line between the remote fuel bulk storage tank and the equipment fuel storage tank.

21. The system of claim 18, wherein the head of the cap includes a fuel line connected to the fuel supply line for delivering fuel into the equipment fuel storage tank.

\* \* \* \* \*